United States Patent
Harris et al.

(10) Patent No.: US 10,190,019 B2
(45) Date of Patent: Jan. 29, 2019

(54) MULTISTAGE POLYMERS AND COMPOSITIONS THEREOF

(71) Applicant: BASF SE, Ludwigshafen (DE)

(72) Inventors: Paul J. Harris, Tega Cay, SC (US); Michael J. Drewery, Charlotte, NC (US); Eric Casebolt, Fort Mill, SC (US); Nicholas Foley, Charlotte, NC (US)

(73) Assignee: BASF SE, Ludwigshafen (DE)

( * ) Notice: Subject to any disclaimer, the term of this patent is extended or adjusted under 35 U.S.C. 154(b) by 202 days.

(21) Appl. No.: 15/103,963

(22) PCT Filed: Dec. 3, 2014

(86) PCT No.: PCT/EP2014/076353
§ 371 (c)(1),
(2) Date: Jun. 13, 2016

(87) PCT Pub. No.: WO2015/086389
PCT Pub. Date: Jun. 18, 2015

(65) Prior Publication Data
US 2016/0355698 A1 Dec. 8, 2016

Related U.S. Application Data

(60) Provisional application No. 61/915,598, filed on Dec. 13, 2013.

(51) Int. Cl.
| C09D 151/00 | (2006.01) |
| C08F 265/06 | (2006.01) |
| C08K 5/523 | (2006.01) |
| C09D 151/06 | (2006.01) |

(52) U.S. Cl.
CPC ........ *C09D 151/003* (2013.01); *C08F 265/06* (2013.01); *C08K 5/523* (2013.01); *C09D 151/06* (2013.01)

(58) Field of Classification Search
None
See application file for complete search history.

(56) References Cited

U.S. PATENT DOCUMENTS

| 7,906,577 B2* | 3/2011 | Zong | C09D 133/02 |
| | | | 524/497 |
| 2002/0096088 A1* | 7/2002 | Bardman | C08F 220/18 |
| | | | 106/436 |
| 2013/0303674 A1* | 11/2013 | Dombrowski | C09D 113/02 |
| | | | 524/359 |

FOREIGN PATENT DOCUMENTS

| WO | 2013096162 A1 | 6/2013 |
| WO | 2013119524 A1 | 8/2013 |

OTHER PUBLICATIONS

Thermal Transitions of Homopolymers, Feb. 1, 2002 (Year: 2002).*
Eastman AAEM (acetoacetoxyethyl methacrylate) datasheet, Dec. 2013. (Year: 2013).*
International Search Report and Written Opinion of the EPO International Searching Authority from Application No. PCT/EP2014/076353, dated Feb. 9, 2015, 6 pages.

* cited by examiner

*Primary Examiner* — Christopher M Rodd
(74) *Attorney, Agent, or Firm* — Meunier Carlin & Curfman LLC

(57) ABSTRACT

Provided are multistage polymers that comprise (i) a first stage comprising a first copolymer having a first theoretical $T_g$, the first copolymer being derived from a soft ethylenically-unsaturated monomer, a phosphorus-containing monomer, and an acetoacetoxy monomer; and (ii) a second stage comprising a second polymer having a second theoretical $T_g$, the second polymer being derived from one or more hard ethylenically-unsaturated monomers. The multistage polymers can be in the form of multilayer particles that comprise (i) a first layer comprising the first copolymer; and (ii) a second layer surrounding at least a portion of the first layer comprising the second polymer. Also provided are aqueous compositions including one or more of the multistage polymers (or multilayer particles) described herein, as well as methods for making the multistage polymers (or multilayer particles) described herein.

12 Claims, No Drawings

MULTISTAGE POLYMERS AND COMPOSITIONS THEREOF

CROSS-REFERENCE TO RELATED APPLICATIONS

This application is a national stage application of PCT/EP2014/076353, filed Dec. 3, 2014, which claims the benefit of U.S. Provisional Application No. 61/915,598, filed Dec. 13, 2013, the disclosure of which is hereby incorporated by reference in its entirety.

FIELD OF THE DISCLOSURE

The present disclosure relates generally to multistage polymers, as well as coating compositions containing multistage polymers for use in a variety of applications.

BACKGROUND

Paints and coatings based on emulsion polymers, generally referred to as "latex" paints or coatings, are well known and widely used in a variety of applications. In particular, latex paints have captured a significant portion of the indoor and outdoor paint market, primarily because of their significant advantages over organic solvent-based paints. For example, latex paints offer easier cleanup than solvent-based paints. Latex paints also provide for reduced levels of volatile organic solvents as compared to solvent-based paints.

In spite of their many advantages, the coating properties and storage stability of many latex paints can be inferior to those of solvent-based paints. For example, coatings formed from latex paints often exhibit decreased durability and adhesion as compared to coatings formed from organic solvent-based paints. Thus, there is a continuing need for latexes which can provide coatings or films having excellent performance properties, including blocking resistance, water and chemical resistance (e.g., stain resistance), scrub resistance, and excellent film formation.

SUMMARY OF THE DISCLOSURE

Provided herein are multistage polymers that comprise (i) a first stage comprising a first copolymer having a first theoretical glass-transition temperature ($T_g$), the first copolymer being derived from a soft ethylenically-unsaturated monomer, a phosphorus-containing monomer, and an acetoacetoxy monomer; and (ii) a second stage comprising a second polymer having a second theoretical $T_g$, the second polymer being derived from one or more hard ethylenically-unsaturated monomers. The multistage polymers can be in the form of multilayer particles that comprise (i) a first layer comprising a first copolymer having a first theoretical $T_g$, the first copolymer being derived from a soft ethylenically-unsaturated monomer, a phosphorus-containing monomer, and an acetoacetoxy monomer; and (ii) a second layer surrounding at least a portion of the first layer comprising a second polymer having a second theoretical $T_g$, the second polymer being derived from one or more hard ethylenically-unsaturated monomers. In some embodiments, the multistage polymer (or the multilayer particles) can exhibit a single $T_g$, measured using differential scanning calorimetry (DSC), ranging from −10° C. to 25° C.

The first copolymer can have a theoretical $T_g$ of 30° C. or less (e.g., 20° C. or less). The second polymer can have a theoretical $T_g$ of at least 60° C. (e.g., of at least 90° C.). The second theoretical $T_g$ can be at least 40° C. than the first theoretical $T_g$ (e.g, at least 50° C. greater than the first theoretical $T_g$, or at least 75° C. greater than the first theoretical $T_g$).

The first copolymer polymer can include an acrylic-based copolymer. In some embodiments, the first copolymer can be derived from (i) one or more (meth)acrylate monomers (e.g., from greater than 80% by weight of one or more (meth)acrylate monomers such as methyl methacrylate, butyl acrylate, 2-ethylhexylacrylate, and combinations thereof, based on the total weight of the monomers used to form the first copolymer); (ii) one or more carboxylic acid-containing monomers (from greater than 0% by weight to 5% by weight itaconic acid); (iii) one or more acetoacetoxy monomers (from greater than 0% by weight to 10% by weight acetoacetoxyethyl (meth)acrylate); (iv) one or more phosphorus-containing monomers (from greater than 0% by weight to 5% by weight 2-phosphoethyl(meth)acrylate); and (v) optionally one or more additional ethylenically-unsaturated monomers, excluding monomers (i), (ii), (iii), and (iv).

The second polymer can be derived from at least 50% by weight of one or more hard ethylenically-unsaturated monomers, based on the total weight of the monomers used to form the second polymer. In some embodiments, the second polymer can be derived from one or more ethylenically-unsaturated monomers that, when homopolymerized, form a polymer having a $T_g$, as measured using DSC, of at least 80° C. In some instances, the second polymer can be derived from one or more hard ethylenically-unsaturated monomers selected from the group consisting of methyl methacrylate, styrene, and combination thereof. In certain embodiments, the second polymer can be derived from at least 90% by weight of one or more hard ethylenically-unsaturated monomers selected from the group consisting of methyl methacrylate, styrene, and combination thereof, based on the total weight of monomers used to form the second polymer. In certain embodiments, the second polymer is derived from at least 95% by weight methyl methacrylate, based on the total weight of monomers used to form the second copolymer.

Also provided are aqueous compositions comprising one or more of the multistage polymers (or multilayer particles) described above. The aqueous compositions can further include one or more additives, including pigments, fillers, dispersants, coalescents, pH modifying agents, plasticizers, defoamers, surfactants, thickeners, biocides, co-solvents, and combinations thereof. In some cases, the composition can be, for example, a coating composition, such as a paint, a primer, or a paint-and-primer-in-one formulation.

In some embodiments, the aqueous composition can further comprise one or more aryl phosphate surfactants. For example, the composition can include from greater than 0% by weight to 10% by weight of one or more aryl phosphate surfactants, based on the total weight of all components of the aqueous composition. In certain embodiments, the aryl phosphate surfactant can comprise a tristyrylphenol alkoxylated phosphate.

Also provided are methods of making the multistage polymers (or multilayer particles) described herein.

DETAILED DESCRIPTION

As used herein, the term "(meth)acrylate monomer" includes acrylate, methacrylate, diacrylate, and dimethacrylate monomers.

As used herein, the term "theoretical glass transition temperature" or "theoretical $T_g$" refers to the estimated $T_g$ of a polymer or copolymer calculated using the Fox equation.

The Fox equation can be used to estimate the glass transition temperature of a polymer or copolymer as described, for example, in L. H. Sperling, "Introduction to Physical Polymer Science", 2nd Edition, John Wiley & Sons, New York, p. 357 (1992) and T. G. Fox, *Bull. Am. Phys. Soc,* 1, 123 (1956), both of which are incorporated herein by reference. For example, the theoretical glass transition temperature of a copolymer derived from monomers a, b, . . . , and i can be calculated according to the equation below $$\frac{1}{T_g} = \frac{w_a}{T_{ga}} + \frac{w_b}{T_{gb}} + \ldots + \frac{w_i}{T_{gi}}$$

where $w_a$ is the weight fraction of monomer a in the copolymer, $T_{ga}$ is the glass transition temperature of a homopolymer of monomer a, $w_b$ is the weight fraction of monomer b in the copolymer, $T_{gb}$ is the glass transition temperature of a homopolymer of monomer b, $w_i$ is the weight fraction of monomer i in the copolymer, $T_{gi}$ is the glass transition temperature of a homopolymer of monomer i, and $T_g$ is the theoretical glass transition temperature of the copolymer derived from monomers a, b, . . . , and i.

Provided herein are multistage polymers that comprise (i) a first stage comprising a first copolymer having a first theoretical $T_g$, the first copolymer being derived from a soft ethylenically-unsaturated monomer, a phosphorus-containing monomer, and an acetoacetoxy monomer; and (ii) a second stage comprising a second polymer having a second theoretical $T_g$, the second polymer being derived from one or more hard ethylenically-unsaturated monomers. The multistage polymers can be in the form of multilayer particles that comprise (i) a first layer comprising a first copolymer having a first theoretical $T_g$, the first copolymer being derived from a soft ethylenically-unsaturated monomer, a phosphorus-containing monomer, and an acetoacetoxy monomer; and (ii) a second layer surrounding at least a portion of the first layer comprising a second polymer having a second theoretical $T_g$, the second polymer being derived from one or more hard ethylenically-unsaturated monomers.

The multilayer particles can include a first layer and a second layer surrounding at least a portion of the first layer. For example, the multilayer particles can range from core-shell particles to so-called "acorn" particles, wherein the second layer surrounds a substantial portion of the first layer either in a continuous, semi-continuous or discontinuous fashion (e.g., such that the second layer forms at least 10%, at least 15%, at least 20%, at least 25%, at least 30%, at least 35%, at least 40%, at least 45%, at least 50%, at least 55%, at least 60%, at least 65%, at least 70%, at least 75%, at least 80%, at least 85%, at least 90%, or at least 95% of the particle surface). In some embodiments, the first layer and the second layer form first and second domains within the multilayer particle, wherein the second layer surrounds at least a portion of the first layer.

The weight ratio of the first stage (or first layer) to the second stage (or second layer) can be at least 5:1 (e.g., at least 5.5:1, at least 6:1, at least 6.5:1, at least 7:1, at least 7.5:1, at least 8:1, at least 8.5:1, at least 9:1, at least 9.5:1, at least 10:1, at least 11:1, at least 12:1, at least 13:1, at least 14:1, at least 15:1, at least 16:1, at least 17:1, at least 18:1, or at least 19:1). The weight ratio of the first stage (or first layer) to the second stage (or second layer) can be 20:1 or less (e.g., 19:1 or less, 18:1 or less, 17:1 or less, 16:1 or less, 15:1 or less, 14:1 or less, 13:1 or less, 12:1 or less, 11:1 or less, 10:1 or less, 9.5:1 or less, 9:1 or less, 8.5:1 or less, 8:1 or less, 7.5:1 or less, 7:1 or less, 6.5:1 or less, 6:1 or less, or 5.5:1 or less).

The weight ratio of the first stage (or first layer) to the second stage (or second layer) can range from any of the minimum ratios described above to any of the maximum values described above. For example, the weight ratio of the first stage (or first layer) to the second stage (or second layer) can be from 5:1 to 20:1 (e.g., from 5:1 to 15:1, or from 5:1 to 10:1).

In some embodiments, the first theoretical $T_g$ can be 30° C. or less (e.g., 25° C. or less, 20° C. or less, 15° C. or less, 10° C. or less, 5° C. or less, 0° C. or less, −5° C. or less, −10° C. or less, −15° C. or less, −20° C. or less, −25° C. or less, −30° C. or less, −35° C. or less, −40° C. or less, or −45° C. or less). In some embodiments, the first theoretical $T_g$ can be at least −50° C. (e.g., at least −45° C., at least −40° C., at least −35° C., at least −30° C., at least −25° C., at least −20° C., at least −15° C., at least −10° C., at least −5° C., at least −0° C., at least 5° C., at least 10° C., at least 15° C., at least 20° C., or at least 25° C.).

The first theoretical $T_g$ can range from any of the minimum values described above to any of the maximum values described above. For example, the first theoretical $T_g$ can range from −50° C. to 30° C. (e.g., from −30° C. to 30° C., from −10° C. to 25° C., or from −0° C. to 20° C.).

In some embodiments, the second theoretical $T_g$ can be at least 60° C. (e.g., at least 65° C., at least 70° C., at least 75° C., at least 80° C., at least 85° C., at least 90° C., at least 95° C., at least 100° C., at least 105° C., at least 110° C., or at least 115° C.). In some embodiments, the second theoretical $T_g$ can be 120° C. or less (e.g., 115° C. or less, 110° C. or less, 105° C. or less, 100° C. or less, 95° C. or less, 90° C. or less, 85° C. or less, 80° C. or less, 75° C. or less, 70° C. or less, or 65° C. or less).

The second theoretical $T_g$ can range from any of the minimum values described above to any of the maximum values described above. For example, the second theoretical $T_g$ can range from 60° C. to 120° C. (e.g., from 75° C. to 120° C., from 80° C. to 110° C., or from 90° C. to 110° C.).

The second theoretical $T_g$ can be greater than the first theoretical $T_g$. In some embodiments, the second theoretical $T_g$ can be at least 40° C. greater than the first theoretical $T_g$ (e.g., at least 45° C. greater, at least 50° C. greater, at least 55° C. greater, at least 60° C. greater, at least 65° C. greater, at least 70° C. greater, at least 75° C. greater, at least 80° C. greater, at least 85° C. greater, at least 90° C. greater, at least 95° C. greater, at least 100° C. greater, at least 105° C. greater, at least 110° C. greater, at least 115° C. greater, or at least 120° C. greater).

In some embodiments, the multistage polymer (or the multilayer particle) exhibits a single $T_g$, measured using differential scanning calorimetry (DSC), of at least −10° C. (e.g., at least −5° C., at least 0° C., at least 5° C., at least 10° C., at least 15° C., or at least 20° C.). In some embodiments, the multistage polymer (or the multilayer particle) exhibits a single $T_g$, measured using DSC, of 25° C. or less (e.g., 20° C. or less, 15° C. or less, 10° C. or less, 5° C. or less, 0° C. or less, or −5° C. or less).

The multistage polymer (or the multilayer particle) can exhibit a single $T_g$, measured using DSC, ranging from any of the minimum values described above to any of the maximum values described above. For example, the multistage polymer (or the multilayer particle) can exhibit a single $T_g$, measured using DSC, from −10° C. to 25° C. (e.g., from 0° C. to 25° C., or from 10° C. to 25° C.). The glass transition temperature can be determined by differential scanning calorimetry (DSC) by measuring the midpoint temperature using ASTM D 3418-12e1.

The first copolymer and the second polymer can be derived from ethylenically-unsaturated monomers. Exemplary ethylenically-unsaturated monomers include (meth) acrylate monomers, vinyl aromatic monomers (e.g., styrene), ethylenically unsaturated aliphatic monomers (e.g., butadiene), vinyl ester monomers (e.g., vinyl acetate), and combinations thereof.

In some embodiments, the first copolymer polymer can include an acrylic-based copolymer. Acrylic-based copolymers include copolymers derived from one or more (meth) acrylate monomers. The acrylic-based copolymer can be a pure acrylic polymer (i.e., a copolymer derived primarily from (meth)acrylate monomers), a styrene-acrylic polymer (i.e., a copolymer derived from styrene and one or more (meth)acrylate monomers), or a vinyl-acrylic polymer (i.e., a copolymer derived from one or more vinyl ester monomers and one or more (meth)acrylate monomers).

The first copolymer can be derived from one or more soft ethylenically-unsaturated monomers. As used herein, the term "soft ethylenically-unsaturated monomer" refers to an ethylenically-unsaturated monomer that, when homopolymerized, forms a polymer having a glass transition temperature, as measured using differential scanning calorimetry (DSC), of 0° C. or less. Soft ethylenically-unsaturated monomers are known in the art, and include, for example, ethyl acrylate ($T_g$=−24° C.), butyl acrylate (n-butyl acrylate, $T_g$=−54° C.), sec-butyl acrylate ($T_g$=−26° C.), sec-butyl acrylate ($T_g$=−26° C.), isobutyl acrylate ($T_g$=−24° C.), n-hexyl acrylate ($T_g$=−45° C.), n-hexyl methacrylate ($T_g$=−5° C.), 2-ethylhexyl acrylate ($T_g$=−85° C.), 2-ethylhexyl methacrylate ($T_g$=−10° C.), octyl methacrylate ($T_g$=−20° C.), n-decyl methacrylate ($T_g$=−30° C.), isodecyl acrylate ($T_g$=−55° C.), dodecyl acrylate ($T_g$=−3° C.), dodecyl methacrylate ($T_g$=−65° C.), 2-ethoxyethyl acrylate ($T_g$=−50° C.), 2-methoxy acrylate ($T_g$=−50° C.), and 2-(2-ethoxyethoxy) ethyl acrylate ($T_g$=−70° C.).

In some embodiments, the first copolymer can be derived from a soft ethylenically-unsaturated monomer that, when homopolymerized, forms a polymer having a glass transition temperature, as measured using DSC, of −10° C. or less (e.g., −20° C. or less, −30° C. or less, −40° C. or less, −50° C. or less, −60° C. or less, −70° C. or less, or −80° C. or less). In certain embodiments, the soft ethylenically-unsaturated monomer can be a (meth)acrylate monomer. In certain embodiments, the first copolymer can be derived from a soft ethylenically-unsaturated monomer selected from the group consisting of butyl acrylate, 2-ethylhexyl acrylate, and combinations thereof.

The first copolymer can be derived from at least 10% by weight of one or more soft ethylenically-unsaturated monomers, based on the total weight of the monomers used to form the first copolymer (e.g., at least 15% by weight, at least 20% by weight, at least 25% by weight, at least 30% by weight, at least 35% by weight, at least 40% by weight, at least 45% by weight, at least 50% by weight, at least 55% by weight, at least 60% by weight, at least 65% by weight, at least 70% by weight, at least 75% by weight, or at least 80% by weight). The first copolymer can be derived from at most 85% by weight of one or more soft ethylenically-unsaturated monomers, based on the total weight of the monomers used to form the first copolymer (e.g., at most 80% by weight, at most 75% by weight, at most 70% by weight, at most 65% by weight, at most 60% by weight, at most 55% by weight, at most 50% by weight, at most 45% by weight, at most 40% by weight, at most 35% by weight, at most 30% by weight, at most 25% by weight, at most 20% by weight, or at most 15% by weight).

The first copolymer can be derived from an amount of one or more soft ethylenically-unsaturated monomers ranging from any of the minimum percentages described above to any of the maximum percentages described above. For example, the first copolymer can be derived from 15% to 85% by weight of one or more soft ethylenically-unsaturated monomers, based on the total weight of the monomers used to form the first copolymer (e.g., from 15% to 60% by weight, from 25% to 60% by weight, from 30% to 60% by weight, or from 35% to 55% by weight).

The first copolymer can be derived from one or more phosphorus-containing monomers. Suitable phosphorous-containing monomers are known in the art, and include dihydrogen phosphate esters of alcohols in which the alcohol contains a polymerizable vinyl or olefinic group, allyl phosphate, phosphoalkyl(meth)acrylates such as 2-phosphoethyl(meth)acrylate (PEM), 2-phosphopropyl(meth)acrylate, 3-phosphopropyl (meth)acrylate, and phosphobutyl (meth)acrylate, 3-phospho-2-hydroxypropyl(meth)acrylate, mono- or di-phosphates of bis(hydroxymethyl) fumarate or itaconate; phosphates of hydroxyalkyl(meth)acrylate, 2-hydroxyethyl(meth)acrylate, 3-hydroxypropyl(meth)acrylate, ethylene oxide condensates of (meth)acrylates, $H_2C=C(CH_3)COO(CH_2CH_2O)_nP(O)(OH)_2$, and analogous propylene and butylene oxide condensates, where n is an integer ranging from 1 to 50, phosphoalkyl crotonates, phosphoalkyl maleates, phosphoalkyl fumarates, phosphodialkyl (meth)acrylates, phosphodialkyl crotonates, vinyl phosphonic acid, allyl phosphonic acid, 2-acrylamido-2methylpropanephosphinic acid, α-phosphonostyrene, 2-methylacrylamido-2-methylpropanephosphinic acid, (hydroxy) phosphinylalkyl(meth)acrylates, (hydroxy) phosphinylmethyl methacrylate, and combinations thereof.

The first copolymer can be derived from greater than 0% by weight of one or more phosphorus-containing monomers, based on the total weight of the monomers used to form the first copolymer (e.g., at least 0.5% by weight, at least 1% by weight, at least 1.5% by weight, at least 2% by weight, at least 2.5% by weight, at least 3% by weight, at least 3.5% by weight, at least 4% by weight, or at least 4.5% by weight). The first copolymer can be derived from 5% or less by weight of one or more phosphorus-containing monomers, based on the total weight of the monomers used to form the first copolymer (e.g., from 4.5% or less by weight, from 4% or less by weight, from 3.5% or less by weight, from 3% or less by weight, from 2.5% or less by weight, from 2% or less by weight, from 1.5% or less by weight, from 1% or less by weight, or from 0.5% or less by weight).

The first copolymer can be derived from an amount of one or more phosphorus-containing monomers ranging from any of the minimum percentages described above to any of the maximum percentages described above. For example, the first copolymer can be derived from greater than 0% by weight to 5% by weight of one or more phosphorus-containing monomers, based on the total weight of the monomers used to form the first copolymer (e.g., from greater than 0% by weight to 2.5% by weight of one or more phosphorus-containing monomers). In certain embodiments, the first copolymer is derived from greater than 0% by weight to 5% by weight (e.g., greater than 0% by weight to 3% by weight, greater than 0% by weight to 2.5% by weight, or greater than 0% by weight to 1.5% by weight) 2-phosphoethyl methacrylate (PEM).

The first copolymer can be derived from one or more acetoacetoxy monomers. Suitable acetoacetoxy monomers are known in the art, and include acetoacetoxyalkyl (meth) acrylates, such as acetoacetoxyethyl (meth)acrylate (AAEM), acetoacetoxypropyl (meth)acrylate, acetoacetoxybutyl (meth)acrylate, and 2,3-di(acetoacetoxy)propyl (meth) acrylate; allyl acetoacetate; vinyl acetoacetate; and combinations thereof.

The first copolymer can be derived from greater than 0% by weight of one or more acetoacetoxy monomers, based on the total weight of the monomers used to form the first copolymer (e.g., at least 0.5% by weight, at least 1% by weight, at least 1.5% by weight, at least 2% by weight, at least 2.5% by weight, at least 3% by weight, at least 3.5% by weight, at least 4% by weight, at least 4.5% by weight, at least 5% by weight, at least 5.5% by weight, at least 6% by weight, at least 6.5% by weight, at least 7% by weight, at least 7.5% by weight, at least 8% by weight, at least 8.5% by weight, at least 9% by weight, or at least 9.5% by weight). The first copolymer can be derived from 10% or less by weight of one or more acetoacetoxy monomers, based on the total weight of the monomers used to form the first copolymer (e.g., from 9.5% or less by weight, from 8% or less by weight, from 8.5% or less by weight, from 8% or less by weight, from 7.5% or less by weight, from 7% or less by weight, from 6.5% or less by weight, from 6% or less by weight, from 5.5% or less by weight, from 5% or less by weight, from 4.5% or less by weight, from 4% or less by weight, from 3.5% or less by weight, from 3% or less by weight, from 2.5% or less by weight, from 2% or less by weight, from 1.5% or less by weight, from 1% or less by weight, or from 0.5% or less by weight).

The first copolymer can be derived from an amount of one or more acetoacetoxy monomers ranging from any of the minimum percentages described above to any of the maximum percentages described above. For example, the first copolymer can be derived from greater than 0% by weight to 10% by weight of one or more acetoacetoxy monomers, based on the total weight of the monomers used to form the first copolymer (e.g., from 1% by weight to 7.5% by weight of one or more acetoacetoxy monomers, from 2.5% by weight to 7.5% by weight of one or more acetoacetoxy monomers, or from 5% by weight to 7.5% by weight of one or more acetoacetoxy monomers). In certain embodiments, the first copolymer is derived from greater than 0% by weight to 10% by weight (e.g., from 1% by weight to 7.5% by weight, from 2.5% by weight to 7.5% by weight, or from 5% by weight to 7.5% by weight) acetoacetoxyethyl (meth) acrylate (AAEM).

The first copolymer can be derived from one or more additional ethylenically-unsaturated monomers (e.g., carboxylic acid-containing monomers, (meth)acrylate monomers, vinyl aromatic monomers, etc.) as described below in addition to one or more soft ethylenically-unsaturated monomers, one or more phosphorus-containing monomers, and one or more acetoacetoxy monomers.

In some embodiments, the first copolymer is derived from:
(i) one or more (meth)acrylate monomers;
(ii) one or more carboxylic acid-containing monomers;
(iii) one or more acetoacetoxy monomers;
(iv) one or more phosphorus-containing monomers; and
(v) optionally one or more additional ethylenically-unsaturated monomers, excluding monomers (i), (ii), (iii), and (iv).

The first copolymer can be derived from at least 55% by weight of one or more (meth)acrylate monomers (e.g., at least 60% by weight, at least 65% by weight, at least 70% by weight, at least 75% by weight, at least 80% by weight, at least 85% by weight, at least 88% by weight, at least 90% by weight, at least 91% by weight, at least 92% by weight, at least 93% by weight, at least 94% by weight, or at least 95% by weight), based on the total weight of the monomers used to form the first copolymer. The (meth)acrylate monomer can include esters of α,β-monoethylenically unsaturated monocarboxylic and dicarboxylic acids having 3 to 6 carbon atoms with alkanols having 1 to 12 carbon atoms (e.g., esters of acrylic acid, methacrylic acid, maleic acid, fumaric acid, or itaconic acid, with $C_1$-$C_{20}$, $C_1$-$C_{12}$, $C_1$-$C_8$, or $C_1$-$C_4$ alkanols).

Exemplary acrylate and methacrylate monomers include, but are not limited to, methyl acrylate, methyl methacrylate, ethyl acrylate, ethyl methacrylate, butyl acrylate, butyl methacrylate, 2-ethylhexyl acrylate, 2-ethylhexyl methacrylate, isobutyl (meth)acrylate, n-hexyl (meth)acrylate, n-heptyl (meth)acrylate, 2-methylheptyl (meth)acrylate, octyl (meth)acrylate, isooctyl (meth)acrylate, n-nonyl (meth)acrylate, isononyl (meth)acrylate, n-decyl (meth)acrylate, isodecyl (meth)acrylate, dodecyl (meth)acrylate, lauryl (meth) acrylate, tridecyl (meth)acrylate, stearyl (meth)acrylate, glycidyl (meth)acrylate, alkyl crotonates, vinyl acetate, di-n-butyl maleate, di-octylmaleate, hydroxyethyl (meth)acrylate, allyl (meth)acrylate, tetrahydrofurfuryl (meth)acrylate, cyclohexyl (meth)acrylate, 2-ethoxyethyl (meth)acrylate, 2-methoxy (meth)acrylate, 2-(2-ethoxyethoxy)ethyl (meth) acrylate, 2-propylheptyl (meth)acrylate, 2-phenoxyethyl (meth)acrylate, isobornyl (meth)acrylate, caprolactone (meth)acrylate, polypropyleneglycol mono(meth)acrylate, polyethyleneglycol (meth)acrylate, benzyl (meth)acrylate, hydroxypropyl (meth)acrylate, methylpolyglycol (meth) acrylate, 3,4-epoxycyclohexylmethyl (meth)acrylate, 1,6 hexanediol di(meth)acrylate, 1,4 butanediol di(meth)acrylate, and combinations thereof. In some embodiments, the first copolymer is derived from one or more (meth)acrylate monomers selected from the group consisting of methyl methacrylate, butyl acrylate, 2-ethylhexylacrylate, and combinations thereof. In some embodiments, the first copolymer is derived from methyl methacrylate and butyl acrylate.

The first copolymer can be derived from one or more carboxylic acid-containing monomers based on the total weight of monomers. Suitable carboxylic acid-containing monomers are known in the art, and include α,β-monoethylenically unsaturated mono- and dicarboxylic acids, such as acrylic acid, methacrylic acid, itaconic acid, crotonic acid, maleic acid, fumaric acid, dimethacrylic acid, ethylacrylic acid, allylacetic acid, vinylacetic acid, mesaconic acid, methylenemalonic acid, citraconic acid, and combinations thereof.

The first copolymer can be derived from greater than 0% by weight of one or more carboxylic acid-containing monomers, based on the total weight of the monomers used to form the first copolymer (e.g., at least 0.5% by weight, at least 1% by weight, at least 1.5% by weight, at least 2% by weight, at least 2.5% by weight, at least 3% by weight, at least 3.5% by weight, at least 4% by weight, or at least 4.5% by weight). The first copolymer can be derived from 5% or less by weight of one or more carboxylic acid-containing monomers, based on the total weight of the monomers used to form the first copolymer (e.g., from 4.5% or less by weight, from 4% or less by weight, from 3.5% or less by weight, from 3% or less by weight, from 2.5% or less by weight, from 2% or less by weight, from 1.5% or less by weight, from 1% or less by weight, or from 0.5% or less by weight).

The first copolymer can be derived from an amount of one or more carboxylic acid-containing monomers ranging from any of the minimum percentages described above to any of the maximum percentages described above. For example, the first copolymer can be derived from greater than 0% by weight to 5% by weight of one or more carboxylic acid-containing monomers, based on the total weight of the monomers used to form the first copolymer (e.g., from greater than 0% by weight to 2.5% by weight of one or more carboxylic acid-containing monomers). In certain embodiments, the first copolymer is derived from greater than 0% by weight to 5% by weight (e.g., greater than 0% by weight to 3% by weight, greater than 0% by weight to 2.5% by weight, or greater than 0% by weight to 1.5% by weight) itaconic acid.

The first copolymer can be derived from greater than 0% by weight to 35% by weight of one or more additional ethylenically-unsaturated monomers. For example, the first copolymer can further include a vinyl aromatic having up to 20 carbon atoms, a vinyl ester of a carboxylic acid comprising up to 20 carbon atoms, a (meth)acrylonitrile, a vinyl halide, a vinyl ether of an alcohol comprising 1 to 10 carbon atoms, an aliphatic hydrocarbon having 2 to 8 carbon atoms and one or two double bonds, a silane-containing monomer, a (meth)acrylamide, a (meth)acrylamide derivative, a sulfur-based monomer, or a combination of these monomers.

Suitable vinyl aromatic compounds include styrene, α- and p-methylstyrene, α-butylstyrene, 4-n-butylstyrene, 4-n-decylstyrene, vinyltoluene, and combinations thereof. Vinyl esters of carboxylic acids having comprising up to 20 carbon atoms include, for example, vinyl laurate, vinyl stearate, vinyl propionate, versatic acid vinyl esters, vinyl acetate, and combinations thereof. The vinyl halides can include ethylenically unsaturated compounds substituted by chlorine, fluorine or bromine, such as vinyl chloride and vinylidene chloride. The vinyl ethers can include, for example, vinyl ethers of alcohols comprising 1 to 4 carbon atoms, such as vinyl methyl ether or vinyl isobutyl ether. Aliphatic hydrocarbons having 2 to 8 carbon atoms and one or two double bonds can include, for example, hydrocarbons having 4 to 8 carbon atoms and two olefinic double bonds, such as butadiene, isoprene, and chloroprene. Silane containing monomers can include, for example, vinyl silanes, such as vinyltrimethoxysilane, vinyltriethoxysilane (VTEO), vinyl tris(2-methoxyethoxysilane), and vinyl triisopropoxysilane, and (meth)acrylatoalkoxysilanes, such as (meth)acryloyloxypropyltrimethoxysilane, γ-(meth)acryloxypropyltrimethoxysilane, and γ-(meth)acryloxypropyltriethoxysilane. (Meth)acrylamide derivatives include, for example, keto-containing amide functional monomers defined by the general structure below

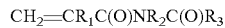

wherein $R_1$ is hydrogen or methyl; $R_2$ is hydrogen, a $C_1$-$C_4$ alkyl group, or a phenyl group; and $R_3$ is hydrogen, a $C_1$-$C_4$ alkyl group, or a phenyl group. For example, the (meth)acrylamide derivative can be diacetone acrylamide (DAAM) or diacetone methacrylamide. Sulfur-containing monomers include, for example, sulfonic acids and sulfonates, such as vinylsulfonic acid, 2-sulfoethyl methacrylate, sodium styrenesulfonate, 2-sulfoxyethyl methacrylate, vinyl butylsulfonate, sulfones such as vinylsulfone, sulfoxides such as vinylsulfoxide, and sulfides such as 1-(2-hydroxyethylthio) butadiene. When present, the sulfur-containing monomers are generally present in an amount greater than 0% by weight to 5% by weight.

In certain embodiments, the first copolymer is derived from
(i) 35-60% by weight butyl acrylate
(ii) 35-55% by weight methyl methacrylate
(iii) greater than 0 to 5% by weight itaconic acid
(iv) greater than 0 to 10% by weight one or more acetoacetoxy monomers; and
(v) greater than 0 to 5% by weight one or more phosphorus containing monomers.

The second polymer can be a homopolymer derived from a single ethylenically-unsaturated monomer or a copolymer derived from ethylenically-unsaturated monomers. In some embodiments, the second polymer includes an acrylic-based polymer. Acrylic-based polymers include polymers derived from one or more (meth)acrylate monomers. The acrylic-based polymer can be a pure acrylic polymer (i.e., a polymer derived exclusively from (meth)acrylate monomers), a styrene-acrylic polymer (i.e., a copolymer derived from styrene and one or more (meth)acrylate monomers), or a vinyl-acrylic polymer (i.e., a copolymer derived from one or more vinyl ester monomers and one or more (meth)acrylate monomers).

The second polymer can be derived from one or more hard ethylenically-unsaturated monomers. As used herein, the term "hard ethylenically-unsaturated monomer" refers to an ethylenically-unsaturated monomer that, when homopolymerized, forms a polymer having a $T_g$, as measured using DSC, of greater than 0° C. Hard ethylenically-unsaturated monomers are known in the art, and include, for example, methyl acrylate ($T_g$=10° C.), methyl methacrylate ($T_g$=120° C.), ethyl methacrylate ($T_g$=65° C.), butyl methacrylate ($T_g$=20° C.), tert-butyl methacrylate ($T_g$=118° C.), isobutyl methacrylate ($T_g$=53° C.), vinyl acetate ($T_g$=30° C.), hydroxyethyl acrylate ($T_g$=15° C.), hydroxyethyl methacrylate ($T_g$=57° C.), cyclohexyl acrylate ($T_g$=19° C.), cyclohexyl methacrylate ($T_g$=92° C.), 2-ethoxyethyl methacrylate ($T_g$=16° C.), 2-phenoxyethyl methacrylate ($T_g$=54° C.), benzyl acrylate ($T_g$=6° C.), benzyl methacrylate ($T_g$=54° C.), hydroxypropyl methacrylate ($T_g$=76° C.), styrene ($T_g$=100° C.), 4-acetostyrene ($T_g$=116° C.), acrylamide ($T_g$=165° C.), acrylonitrile ($T_g$=125° C.), 4-bromostyrene ($T_g$=118° C.), n-tert-butylacrylamide ($T_g$=128° C.), 4-tert-butylstyrene ($T_g$=127° C.), 2,4-dimethylstyrene ($T_g$=112° C.), 2,5-dimethylstyrene ($T_g$=143° C.), 3,5-dimethylstyrene ($T_g$=104° C.), isobornyl acrylate ($T_g$=94° C.), isobornyl methacrylate ($T_g$=110° C.), 4-methoxystyrene ($T_g$=113° C.), methylstyrene ($T_g$=20° C.), 4-methylstyrene ($T_g$=97° C.), 3-methylstyrene ($T_g$=97° C.), 2,4,6-trimethylstyrene ($T_g$=162° C.), and combinations thereof.

In some embodiments, the second polymer can be derived from one or more hard ethylenically-unsaturated monomers that, when homopolymerized, form a polymer having a $T_g$, as measured using DSC, of at least 80° C. (e.g., at least 85° C., at least 90° C., at least 95° C., at least 100° C., at least 105° C., at least 110° C., at least 115° C., or at least 120° C.).

In some embodiments, the second polymer can be derived from greater than 50% by weight or greater of one or more hard ethylenically-unsaturated monomers (e.g., 65% by weight or greater, 75% by weight or greater, 80% by weight or greater, 85% by weight or greater, 88% by weight or greater, 90% by weight or greater, 91% by weight or greater, 92% by weight or greater, 93% by weight or greater, 94% by weight or greater, or 95% by weight or greater of the hard ethylenically-unsaturated monomer) based on the total weight of monomers used to form the second polymer.

In some embodiments, the second polymer can be derived from one or more hard ethylenically-unsaturated monomers selected from the group consisting of methyl methacrylate, styrene, and combinations thereof. In certain embodiments, the second polymer is derived from at least 90% by weight (e.g., at least 90% by weight, at least 91% by weight, at least 92% by weight, at least 93% by weight, at least 94% by weight, at least 95% by weight, at least 96% by weight, at least 97% by weight, at least 98% by weight, or at least 99% by weight) of one or more hard ethylenically-unsaturated monomers selected from the group consisting of methyl methacrylate, styrene, and combinations thereof, based on the total weight of monomers used to form the second polymer. In certain embodiments, the second polymer is derived from at least 85% by weight (e.g., at least 86% by weight, at least 87% by weight, at least 88% by weight, at least 89% by weight, at least 90% by weight, at least 91% by weight, at least 92% by weight, at least 93% by weight, at least 94% by weight, at least 95% by weight, at least 96% by weight, at least 97% by weight, at least 98% by weight, or at least 99% by weight) methyl methacrylate, based on the total weight of monomers used to form the second polymer.

The second polymer can be derived from one or more additional ethylenically-unsaturated monomers (e.g., (meth) acrylate monomers, carboxylic acid-containing monomers, acetoacetoxy monomers, phosphorus-containing monomers, etc.), such as those described above, in addition to one or more hard ethylenically-unsaturated monomers. In certain embodiments, the second polymer is substantially free (i.e., is derived from less than 0.25% by weight) of acetoacetoxy monomers and/or phosphorus-containing monomers. In certain embodiments, the second polymer is substantially free (i.e., is derived from less than 0.25% by weight) of carboxylic acid-containing monomers.

Also provided are aqueous compositions comprising one or more of the multistage polymers (or multilayer particles) described above. The aqueous compositions can further include one or more additives, including pigments, fillers, dispersants, coalescents, pH modifying agents, plasticizers, defoamers, surfactants, thickeners, biocides, co-solvents, and combinations thereof. The choice of additives in the composition will be influenced by a number of factors, including the nature of the multistage polymers (or multilayer particles) dispersed in the aqueous composition, as well as the intended use of the composition. In some cases, the composition can be, for example, a coating composition, such as a paint, a primer, or a paint-and-primer-in-one formulation. In some embodiments, the composition comprises less than or equal to 50 grams per liter of volatile organic compounds.

In some embodiments, the aqueous composition can further comprise an aryl phosphate surfactant. The composition can include greater than 0% by weight of one or more aryl phosphate surfactants, based on the total weight of all components of the aqueous composition (e.g., at least 0.5% by weight, at least 1% by weight, at least 1.5% by weight, at least 2% by weight, at least 2.5% by weight, at least 3% by weight, at least 3.5% by weight, at least 4% by weight, at least 4.5% by weight, at least 5% by weight, at least 5.5% by weight, at least 6% by weight, at least 6.5% by weight, at least 7% by weight, at least 7.5% by weight, at least 8% by weight, at least 8.5% by weight, at least 9% by weight, or at least 9.5% by weight). The composition can include 10% or less of one or more aryl phosphate surfactants, based on the total weight of all components of the aqueous composition (e.g., from 9.5% or less by weight, from 8% or less by weight, from 8.5% or less by weight, from 8% or less by weight, from 7.5% or less by weight, from 7% or less by weight, from 6.5% or less by weight, from 6% or less by weight, from 5.5% or less by weight, from 5% or less by weight, from 4.5% or less by weight, from 4% or less by weight, from 3.5% or less by weight, from 3% or less by weight, from 2.5% or less by weight, from 2% or less by weight, from 1.5% or less by weight, from 1% or less by weight, or from 0.5% or less by weight).

The composition can include one or more aryl phosphate surfactants in an amount ranging from any of the minimum percentages described above to any of the maximum percentages described above. For example, the composition can include from greater than 0% by weight to 10% by weight of one or more aryl phosphate surfactants, based on the total weight of all components of the aqueous composition (e.g., from greater than 0% by weight to 3% by weight of one or more aryl phosphate surfactants, from greater than 0% by weight to 2.5% by weight of one or more aryl phosphate surfactants, from greater than 0% by weight to 1.5% by weight of one or more aryl phosphate surfactants, or greater than 0% by weight to 1% by weight of one or more aryl phosphate surfactants).

In certain embodiments, the aryl phosphate surfactant can comprise a tristyrylphenol alkoxylated phosphate. Suitable tristyrylphenol alkoxylated phosphates include surfactants defined by Formula I below

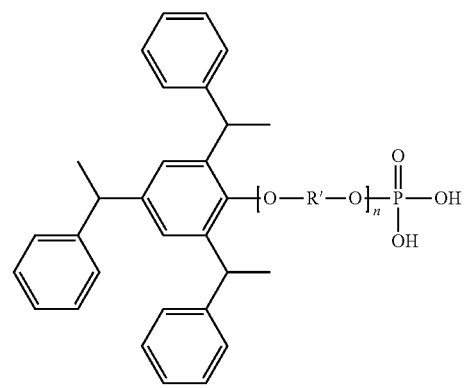

Formula I or a salt thereof, wherein R' comprises a $C_1$-$C_6$ alkylene group, and n is an integer ranging from 1 to 50 (e.g., from 1 to 25, or from 10 to 20). In certain embodiments, the aqueous composition comprises a tristyrylphenol alkoxylated phosphate defined by Formula I or a salt thereof, wherein R' comprises an ethylene group, and n is an integer ranging from 10 to 20. In certain embodiments, the aqueous composition includes the tristyrylphenol alkoxylated phosphate shown below

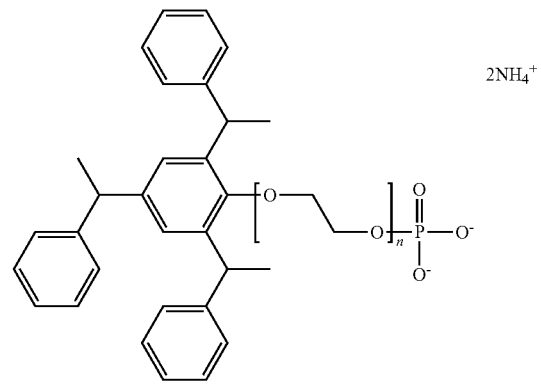

wherein n is 16.

Examples of suitable pigments include metal oxides, such as titanium dioxide, zinc oxide, iron oxide, or combinations thereof. In certain embodiments, the composition includes a titanium dioxide pigment. Examples of commercially titanium dioxide pigments are KRONOS® 2101, KRONOS® 2310, available from Kronos WorldWide, Inc. (Cranbury, N.J.), TI-PURE® R-900, available from DuPont (Wilmington, Del.), or TIONA® AT1 commercially available from Millenium Inorganic Chemicals. Titanium dioxide is also available in concentrated dispersion form. An example of a titanium dioxide dispersion is KRONOS® 4311, also available from Kronos WorldWide, Inc.

Examples of suitable fillers include calcium carbonate, nepheline syenite, (25% nepheline, 55% sodium feldspar, and 20% potassium feldspar), feldspar (an aluminosilicate), diatomaceous earth, calcined diatomaceous earth, talc (hydrated magnesium silicate), aluminosilicates, silica (silicon dioxide), alumina (aluminum oxide), clay, (hydrated aluminum silicate), kaolin (kaolinite, hydrated aluminum silicate), mica (hydrous aluminum potassium silicate), pyrophyllite (aluminum silicate hydroxide), perlite, baryte (barium sulfate), Wollastonite (calcium metasilicate), and combinations thereof. In certain embodiments, the composition comprises a calcium carbonate filler.

Examples of suitable dispersants are polyacid dispersants and hydrophobic copolymer dispersants. Polyacid dispersants are typically polycarboxylic acids, such as polyacrylic acid or polymethacrylic acid, which are partially or completely in the form of their ammonium, alkali metal, alkaline earth metal, ammonium, or lower alkyl quaternary ammonium salts. Hydrophobic copolymer dispersants include copolymers of acrylic acid, methacrylic acid, or maleic acid with hydrophobic monomers. In certain embodiments, the composition includes a polyacrylic acid-type dispersing agent, such as Pigment Disperser N, commercially available from BASF SE.

Suitable coalescents, which aid in film formation during drying, include ethylene glycol monomethyl ether, ethylene glycol monobutyl ether, ethylene glycol monoethyl ether acetate, ethylene glycol monobutyl ether acetate, diethylene glycol monobutyl ether, diethylene glycol monoethyl ether acetate, dipropylene glycol monomethyl ether, 2,2,4-trimethyl-1,3-pentanediol monoisobutyrate, and combinations thereof.

Examples of suitable thickening agents include hydrophobically modified ethylene oxide urethane (HEUR) polymers, hydrophobically modified alkali soluble emulsion (HASE) polymers, hydrophobically modified hydroxyethyl celluloses (HMHECs), hydrophobically modified polyacrylamide, and combinations thereof. HEUR polymers are linear reaction products of diisocyanates with polyethylene oxide end-capped with hydrophobic hydrocarbon groups. HASE polymers are homopolymers of (meth)acrylic acid, or copolymers of (meth)acrylic acid, (meth)acrylate esters, or maleic acid modified with hydrophobic vinyl monomers. HMHECs include hydroxyethyl cellulose modified with hydrophobic alkyl chains. Hydrophobically modified polyacrylamides include copolymers of acrylamide with acrylamide modified with hydrophobic alkyl chains (N-alkyl acrylamide). In certain embodiments, the coating composition includes a hydrophobically modified hydroxyethyl cellulose thickener.

Examples of suitable pH modifying agents include amino alcohols, monoethanolamine (MEA), diethanolamine (DEA), 2-(2-aminoethoxy)ethanol, diisopropanolamine (DIPA), 1-amino-2-propanol (AMP), ammonia, and combinations thereof.

Defoamers serve to minimize frothing during mixing and/or application of the coating composition. Suitable defoamers include silicone oil defoamers, such as polysiloxanes, polydimethylsiloxanes, polyether modified polysiloxanes, and combinations thereof. Exemplary silicone-based defoamers include BYK®-035, available from BYK USA Inc. (Wallingford, Conn.), the TEGO® series of defoamers, available from Evonik Industries (Hopewell, Va.), and the DREWPLUS® series of defoamers, available from Ashland Inc. (Covington, Ky.).

Suitable surfactants include nonionic surfactants and anionic surfactants. Examples of nonionic surfactants are alkylphenoxy polyethoxyethanols having alkyl groups of about 7 to about 18 carbon atoms, and having from about 6 to about 60 oxyethylene units; ethylene oxide derivatives of long chain carboxylic acids; analogous ethylene oxide condensates of long chain alcohols, and combinations thereof. Exemplary anionic surfactants include ammonium, alkali metal, alkaline earth metal, and lower alkyl quaternary ammonium salts of sulfosuccinates, higher fatty alcohol sulfates, aryl sulfonates, alkyl sulfonates, alkylaryl sulfonates, and combinations thereof. In certain embodiments, the composition comprises a nonionic alkylpolyethylene glycol surfactant, such as LUTENSOL® TDA 8 or LUTENSOL® AT-18, commercially available from BASF SE. In certain embodiments, the composition comprises an anionic alkyl ether sulfate surfactant, such as DISPONIL® FES 77, commercially available from BASF SE. In certain embodiments, the composition comprises an anionic diphenyl oxide disulfonate surfactant, such as CALFAX® DB-45, commercially available from Pilot Chemical. In some embodiments, the composition is substantially free (i.e., the composition includes 0.1% or less by weight) of sulfate surfactants. In some embodiments, the composition is substantially free (i.e., the composition includes 0.1% or less by weight) of sulfonate surfactants. In some embodiments, the composition is substantially free (i.e., the composition includes 0.1% or less by weight) of sulfate surfactants and sulfonate surfactants.

Suitable biocides can be incorporated to inhibit the growth of bacteria and other microbes in the coating composition during storage. Exemplary biocides include 2-[(hydroxymethyl)amino]ethanol, 2-[(hydroxymethyl) amino]2-methyl-1-propanol, o-phenylphenol, sodium salt, 1,2-benzisothiazolin-3-one, 2-methyl-4-isothiazolin-3-one (MIT), 5-chloro2-methyland-4-isothiazolin-3-one (CIT), 2-octyl-4-isothiazolin-3-one (OTT), 4,5-dichloro-2-n-octyl-3-isothiazolone, as well as acceptable salts and combinations thereof. Suitable biocides also include mildewcides that inhibit the growth mildew or its spores in the coating. Examples of mildewcides include 2-(thiocyanomethylthio) benzothiazole, 3-iodo-2-propynyl butyl carbamate, 2,4,5,6-tetrachloroisophthalonitrile, 2-(4-thiazolyl)benzimidazole, 2-N-octyl4-isothiazolin-3-one, diiodomethyl p-tolyl sulfone, as well as acceptable salts and combinations thereof. In certain embodiments, the coating composition contains 1,2-benzisothiazolin-3-one or a salt thereof. Biocides of this type include PROXEL® BD20, commercially available from Arch Chemicals, Inc (Atlanta, Ga.).

Exemplary co-solvents and plasticizers include ethylene glycol, propylene glycol, diethylene glycol, and combinations thereof.

Other suitable additives that can optionally be incorporated into the composition include rheology modifiers, wetting and spreading agents, leveling agents, conductivity additives, adhesion promoters, anti-blocking agents, anti-cratering agents and anti-crawling agents, anti-freezing agents, corrosion inhibitors, anti-static agents, flame retardants and intumescent additives, dyes, optical brighteners and fluorescent additives, UV absorbers and light stabilizers, chelating agents, cleanability additives, crosslinking agents, flatting agents, flocculants, humectants, insecticides, lubricants, odorants, oils, waxes and slip aids, soil repellants, stain resisting agents, and combinations thereof.

Coating compositions can be applied to a surface by any suitable coating technique, including spraying, rolling, brushing, or spreading. Coating compositions can be applied in a single coat, or in multiple sequential coats (e.g., in two coats or in three coats) as required for a particular application. Generally, the coating composition is allowed to dry under ambient conditions. However, in certain embodiments, the coating composition can be dried, for example, by heating and/or by circulating air over the coating.

The coating compositions can be applied to a variety of surfaces including, but not limited to metal, asphalt, concrete, stone, ceramic, wood, plastic, polyurethane foam, glass, wall board coverings (e.g., drywall, cement board, etc.), and combinations thereof. The coating compositions can be applied to interior or exterior surfaces. In certain embodiments, the surface is an architectural surface, such as a roof, wall, floor, or combination thereof. The architectural surface can be located above ground, below ground, or combinations thereof.

Also provided are coatings formed from the coating compositions described herein. Generally, coatings are formed by applying a coating composition described herein to a surface, and allowing the coating to dry to form a coating. The coating thickness can vary depending upon the application of the coating.

Also provided are methods of making the multistage polymers and multilayer particles described above. The multistage polymers and multilayer particles described above can be prepared by heterophase polymerization techniques, including, for example, free-radical emulsion polymerization, suspension polymerization, and mini-emulsion polymerization. In some examples, the multistage polymer is prepared by polymerizing the monomers using free-radical emulsion polymerization. The emulsion polymerization temperature can range from 10° C. to 130° C. (e.g., from 50° C. to 90° C.). The polymerization medium can include water alone or a mixture of water and water-miscible liquids, such as methanol, ethanol or tetrahydrofuran. In some embodiments, the polymerization medium is free of organic solvents and includes only water.

The emulsion polymerization can be carried out as a batch process, as a semi-batch process, or in the form of a continuous process. In some embodiments, a portion of the monomers can be heated to the polymerization temperature and partially polymerized, and the remainder of the monomer batch can be subsequently fed to the polymerization zone continuously, in steps, or with superposition of a concentration gradient. In some embodiments, the method of making a multilayer particle comprises (i) polymerizing a soft ethylenically unsaturated monomer, a phosphorus-containing monomer, and an acetoacetoxy monomer in a first emulsion polymerization step to produce a first copolymer having a first theoretical $T_g$; and (ii) polymerizing one or more hard ethylenically unsaturated monomers in a second emulsion polymerization step to produce a second polymer having a second theoretical $T_g$ that is at least 40° C. greater than the first theoretical $T_g$, wherein the one or more hard ethylenically unsaturated monomers comprise at least 50% by weight of the monomers polymerized to form the second polymer. In some embodiments, the first polymerization step and/or the second polymerization step are carried out at a first polymerization temperature ranging from 10° C. to 130° C. (e.g., from 50° C. to 100° C., or from 70° C. to 90° C.). In one embodiment, the first polymerization step and the second polymerization step are carried out at polymerization temperatures of less than or equal to 85° C.

The emulsion polymerization can be performed with a variety of auxiliaries, including water-soluble initiators and regulators. Examples of water-soluble initiators for the emulsion polymerization are ammonium salts and alkali metal salts of peroxodisulfuric acid, e.g., sodium peroxodisulfate, hydrogen peroxide or organic peroxides, e.g., tert-butyl hydroperoxide. Reduction-oxidation (redox) initiator systems are also suitable as initiators for the emulsion polymerization. The redox initiator systems are composed of at least one, usually inorganic, reducing agent and one organic or inorganic oxidizing agent. The oxidizing component comprises, for example, the initiators already specified above for the emulsion polymerization. The reducing components are, for example, alkali metal salts of sulfurous acid, such as sodium sulfite, sodium hydrogen sulfite, alkali metal salts of disulfurous acid such as sodium disulfite, bisulfite addition compounds with aliphatic aldehydes and ketones, such as acetone bisulfite, or reducing agents such as hydroxymethanesulfinic acid and salts thereof, or ascorbic acid. The redox initiator systems can be used in the company of soluble metal compounds whose metallic component is able to exist in a plurality of valence states. Typical redox initiator systems include, for example, ascorbic acid/iron(II) sulfate/sodium peroxodisulfate, tert-butyl hydroperoxide/sodium disulfite, tert-butyl hydroperoxide/Na hydroxymethanesulfinate, or tert-butyl hydroperoxide/ascorbic acid. The individual components, the reducing component for example, can also be mixtures, an example being a mixture of the sodium salt of hydroxymethanesulfinic acid with sodium disulfite. The stated compounds are used usually in the form of aqueous solutions, with the lower concentration being determined by the amount of water that is acceptable in the dispersion, and the upper concentration by the solubility of the respective compound in water. The concentration can be 0.1% to 30%, 0.5% to 20%, or 1.0% to 10%, by weight, based on the solution. The amount of the initiators is generally 0.1% to 10% or 0.5% to 5% by weight, based on the monomers to be polymerized. It is also possible for two or more different initiators to be used in the emulsion polymerization. For the removal of the residual monomers, an initiator can be added after the end of the emulsion polymerization.

In the polymerization it is possible to use molecular weight regulators or chain transfer agents, in amounts, for example, of 0 to 0.8 parts by weight, based on 100 parts by weight of the monomers to be polymerized, to reduce the molecular weight of the copolymer. Suitable examples include compounds having a thiol group such as tert-butyl mercaptan, thioglycolic acid ethylacrylic esters, mercaptoethanol, mercaptopropyltrimethoxysilane, and tert-dodecyl mercaptan. Additionally, it is possible to use regulators without a thiol group, such as terpinolene. In some embodiments, the emulsion polymer is prepared in the presence of greater than 0% to 0.5% by weight, based on the monomer amount, of at least one molecular weight regulator. In some embodiments, the emulsion polymer is prepared in the presence of less than less than 0.3% or less than 0.2% by weight (e.g., 0.10% to 0.15% by weight) of the molecular weight regulator.

Dispersants, such as surfactants, can also be added during polymerization to help maintain the dispersion of the monomers in the aqueous medium. For example, the polymerization can include less than 3% by weight or less than 1% by weight of surfactants. In some embodiments, the polymerization is substantially free of surfactants and can include less than 0.05% or less than 0.01% by weight of one or more surfactants. In other embodiments, the first emulsion polymerization step and/or the second polymerization step further comprise an aryl phosphate surfactant. (e.g., a tristyrylphenol alkoxylated phosphate surfactant).

Anionic and nonionic surfactants can be used during polymerization. Suitable surfactants include ethoxylated $C_8$ to $C_{36}$ or $C_{12}$ to $C_{18}$ fatty alcohols having a degree of ethoxylation of 3 to 50 or of 4 to 30, ethoxylated mono-, di-, and tri-$C_4$ to $C_{12}$ or $C_4$ to $C_9$ alkylphenols having a degree of ethoxylation of 3 to 50, alkali metal salts of dialkyl esters of sulfosuccinic acid, alkali metal salts and ammonium salts of $C_8$ to $C_{12}$ alkyl sulfates, alkali metal salts and ammonium salts of $C_{12}$ to $C_{18}$ alkylsulfonic acids, and alkali metal salts and ammonium salts of $C_9$ to $C_{18}$ alkylarylsulfonic acids.

By way of non-limiting illustration, examples of certain embodiments of the present disclosure are given below.

EXAMPLES

Latex Preparation

A multistage polymer latex comprising a first stage having a theoretical $T_g$ of 12° C. derived from butyl acrylate, methyl methacrylate, itaconic acid, acetoacetoxyethyl methacrylate (AAEM), and 2-phosphoethyl methacrylate (PEM) and a second stage with a theoretical $T_g$ of 100° C. derived from methyl methacrylate ("polymer 1") was prepared by sequential emulsion polymerization steps as described below. A 3 L glass vessel was heated to 85° C. with 435 g of deionized water and 46 g of pre-polymerized seed latex. An initiator (sodium persulfate) was fed to the vessel over the course of the polymerization of both Stage 1 and Stage 2 for 3.8 hours. 1149 g of first stage emulsion comprising the monomer mixture above, an aryl phosphate surfactant, and a non-ionic surfactant was fed to the vessel over 2.5 hours. Subsequently, 212 g of second stage emulsion comprising the monomer mixture above and an aryl phosphate surfactant was fed to the vessel. After Stage 2 was completely fed, the reaction was held at temperature for 30 minutes while ammonium hydroxide and a defoamer were added. Next, the reaction temperature was decreased to 80° C., and tert-butyl hydroperoxide and sodium metabisulfite were simultaneously fed into the reaction over one hour. The reaction was then cooled to 40° C., and the pH adjusted with ammonium hydroxide. A biocide was then added to the reaction mixture. The final latex was filtered through 150 mesh. Polymer 1 exhibited a $T_g$ of 17° C., determined by DSC using the method described in ASTM D 3418-12e1 entitled "Standard Test Method for Transition Temperatures and Enthalpies of Fusion and Crystallization of Polymers by Differential Scanning calorimetry," which is incorporated herein by reference in its entirety.

Polymer 1 was subsequently formulated into a standard eggshell white base formulation (35 g/L VOC (volatile organic concentration), PVC (pigment volume concentration) of 33.7, a volume solids of 42% and a binder weight of 22%).

Stain Blocking

The stain blocking capability of the coating formulation including polymer 1 was assessed by subjectively grading the ability of coatings formed from the formulation to hide stains on a substrate as compared to a control.

Samples were prepared to assess the stain blocking capability of the coating formulation against a variety of stains. Samples were prepared by applying a series of water-based and solvent-based pens and markers (each representing a "stain") on top of a film formed from a fully cured commercially available low VOC, 100% acrylic flat paint. The stains were dried for 24 hours at room temperature. A 7 mil film of the coating formulation containing polymer 1 was then applied over the top of the stains and allowed to dry for 24 hours. A 10 mil thick topcoat of the same commercial grade flat paint was then applied to each sample. Benchmark samples were prepared as described above using a benchmark commercially available low VOC, 100% acrylic eggshell paint-and-primer-in-one paint. Once dried, samples of various stains were compared against their corresponding benchmark samples. The degree of stain hiding of each stain relative to the benchmark is described in Table 1 below.

TABLE 1

Relative stain blocking capability of a coating formulation including polymer 1.
Comparative Differences in Stain Hiding of a Coating Formulation Including Polymer 1 versus a Benchmark

| Underlying "Stain" | Polymer 1 | Benchmark |
| --- | --- | --- |
| Black Sharpie | slight+ | CTRL |
| Black Felt Tip Pen | slight+ | CTRL |
| Red Washable Marker | slight– | CTRL |
| Blue Mega Marker | slight+ | CTRL |
| Blue ballpoint pen | = | CTRL |
| Black Fine point pen | = | CTRL |
| Green Mega Marker | slight+ | CTRL |

"=" indicates roughly equal stain hiding relative to benchmark
"slight+" indicates slightly better stain hiding relative to benchmark
"slight–" indicates slightly worse stain hiding relative to benchmark Stain Resistance The stain resistance of coating formulations including polymer 1 were measured using the method described in ASTM D 4828-94 (2012) entitled "Standard Test Methods for Practical Washability of Organic Coatings," which is incorporated herein by reference in its entirety. The test measured the degree of removal of stains applied to a dried coating.

A 10 mil film of either a standard eggshell white base or semi-gloss white base formulation including polymer 1 was applied to a Leneta Black Scrub Panel. After 7 days of curing at 23° C. and 50% relative humidity, a series of "stains" (ketchup, mustard, coffee, wine, pencil, washable marker, crayon, pen and lipstick) were applied on top of the painted panel. After 1 hour, excess stain material was gently washed off and blotted dry. Panels were then scrubbed for 50 cycles with a sponge and 50 cc of Leneta SC-1 (Standardized Scrub Medium Non-Abrasive type). Once dried, samples were compared against a lead benchmark paint and primer for the degree of stain removal without damage to the underlying coating. Example data is included in Table 2 below.

TABLE 2

Relative stain resistance of coating formulations including polymer 1.
Comparative Differences in Stain Resistance of Coating Formulations Including Polymer 1 versus a Benchmark

| | Eggshell White Base | | Semi-gloss White Base | |
| --- | --- | --- | --- | --- |
| "Stain" | Polymer #1 | Benchmark | Polymer #1 | Benchmark |
| #2 Pencil | = | CTRL | = | CTRL |
| Lipstick - Covergirl Hot Passion 305 | slight+ | CTRL | = | CTRL |
| Crayon - Purple Crayola | = | CTRL | = | CTRL |

TABLE 2-continued

Relative stain resistance of coating formulations including polymer 1. Comparative Differences in Stain Resistance of Coating Formulations Including Polymer 1 versus a Benchmark

| "Stain" | Eggshell White Base | | Semi-gloss White Base | |
|---|---|---|---|---|
| | Polymer #1 | Benchmark | Polymer #1 | Benchmark |
| Washable Marker - Crayola | + | CTRL | = | CTRL |
| Ballpoint Pen - Black Papermate | = | CTRL | = | CTRL |
| Red Wine - Carlo Rossi Burgundy | + | CTRL | + | CTRL |
| Mustard - French's Classic Yellow | slight+ | CTRL | + | CTRL |
| Ketchup - Heinz | = | CTRL | = | CTRL |
| Coffee - Columbian (70° C.) | + | CTRL | + | CTRL |

"=" indicates roughly equal stain resistance relative to benchmark
"slight +" indicates slightly better stain resistance relative to benchmark
"+" indicates much better stain resistance relative to benchmark Scrub Resistance The scrub resistance of coating formulations including polymer 1 were measured using the method described in ASTM D 2486-06 (2012) entitled "Standard Test Methods for Scrub Resistance of Wall Paints," which is incorporated herein by reference in its entirety. In this test, a controlled coating thickness was applied to a substrate, dried for 7 days, and then scrubbed with an automated device in the presence of a cleaning solution or an abrasive scrub media. The total number of cycles was reported when the underlying substrate appeared in a solid line across a shimmed distance. Example data is included in Table 3 below. Coating formulations including polymer 1 exhibited acceptable levels of scrub resistance, comparable to commercially available 100% acrylic paint and primers currently on the market in the same base and sheen.

Adhesion

The adhesion of coating formulations including polymer 1 were measured using the method described in ASTM D 3359-09e2 entitled "Standard Test Methods for Measuring Adhesion by Tape Test," which is incorporated herein by reference in its entirety. Test method B was used with 7 mil wet film thicknesses applied to a cured alkyd coated panel, steel panel and aluminum panel. A visual adhesion rating was noted for each coating (0B—little or no adhesion; 1B—20% adhesion; 2B—40% adhesion; 3B—60% adhesion; 4B—80% adhesion; 5B—100% adhesion). Example data is included in Table 3 below.

Block Resistance

The adhesion of coating formulations including polymer 1 were measured using the method described in ASTM D 4946-89 (2012) entitled "Standard Test Method for Blocking Resistance of Architectural Paints," which is incorporated herein by reference in its entirety. Coatings were applied at a 7 mil wet film thickness to a Leneta plain white chart and allowed to dry for a designated period before testing (1 day, 3 days and 7 days). A 1000 g weight was placed on top of a #8 stopper on top of a face-to-face specimen and held for 30 minutes at either room temperature or 50° C. Samples were cooled to room temperature and rated using the ten point scale described in the ASTM standard (10=no tack, perfect; 9=trace tack, excellent; 8=slight tack, very good; 7=slight tack, good; 6=moderate tack, good; 5=moderate tack, fair; 4=severe tack, no seal, fair; 3=5-25% seal, poor; 2=25-50% seal, poor; 1=50-75% seal, poor; 0=complete seal, very poor tack). Example data is included in Table 3 below.

Leaching Resistance

Leaching refers to resultant streaking or water-marks that result when water is allowed to collect on a dried coating. Leaching resistance was evaluated by applying three drops of water to a 10 mil thick wet, 4-hour aged coating of a coating formulation including polymer 1. The water drops were allowed to sit on the coating for 10 minutes. The panel was then turned vertical so that the water ran down the coating surface. Once dry, the panel was judged for the degree of water-marking observed according to the following scale: 10—Perfect, No Change; 8—Slight Change; 5—Moderate Change; 0—Severe Change. Example data is included in Table 3 below.

Tint Strength

Tint strength is a comparative measure of $TiO_2$ utilization. Tint strength was measured by tinting coating formulations including polymer 1 with identical amounts of tint paste. Following the addition of the tint paste, the coating formulations were mixed fully. A 3 mil film of each coating formulation was cast, the "lightness" of the dry films was quantified with color difference readings. A lighter film exhibits $TiO_2$ utilization and thus higher values are more desirable. Example data is included in Table 3 below.

TABLE 3

Performance of three coating formulations including polymer 1 (an eggshell white base formulation, an eggshell deep base formulation, and a semi-gloss white base formulation). All data is benchmarked against a lead commercial, 100% acrylic paint and primer currently on the market in the same base and sheen.

| | Eggshell White Base | | Semi-gloss White Base | | Eggshell Deep Base | |
|---|---|---|---|---|---|---|
| Test | Polymer #1 | Commercial Paint | Polymer #1 | Commercial Paint | Polymer #1 | Commercial Paint |
| Wet Adhesion on Aluminum | 5B | 0B | 5B | 0B | 0B | 0B |
| Dry Adhesion on Aluminum | 5B | 0B | 5B | 0B | 0B | 0B |
| Wet Adhesion on Alkyd | 5B | 5B | 4B | 5B | 5B | 5B |
| Dry Adhesion on Alkyd | 5B | 5B | 4B | 5B | 5B | 5B |
| Paper Block (1, 3, and 7 Days Drying Time)[1] | 9, -, - | 9, -, - | 9,9,- | 7,9,- | 4,6,- | 7,7,- |

TABLE 3-continued

Performance of three coating formulations including polymer 1 (an eggshell white base formulation, an eggshell deep base formulation, and a semi-gloss white base formulation). All data is benchmarked against a lead commercial, 100% acrylic paint and primer currently on the market in the same base and sheen.

|  | Eggshell White Base | | Semi-gloss White Base | | Eggshell Deep Base | |
|---|---|---|---|---|---|---|
| Test | Polymer #1 | Commercial Paint | Polymer #1 | Commercial Paint | Polymer #1 | Commercial Paint |
| Paper Block (1, 3, and 7 Days Drying Time)[2] | 7,7,9 | 6,6,9 | 5,8,9 | 5,6,8 | 0,2,5 | 0,1,0 |
| Scrub resistance | 1229 | 1359 | 1213 | 1477 | 1286 | 1307 |
| Tint Strength | 100.3 | 100.0 | 102.7 | 100.0 | N/A | N/A |
| Leaching Resistance | N/A | N/A | N/A | N/A | 8 | 7 |

[1] 1 kg weight, 23° C., 30 min
[2] 1 kg weight, 50° C., 30 min

Influence of Surfactants on Coating Properties

The multistage polymer latex prepared above (polymer 1; stabilized with an ammonium phosphate-functionalized ethoxylated tristyrylphenol surfactant) was formulated into a standard eggshell white base formulation. A second multistage polymer latex ("polymer 2") was prepared using the method described above for polymer 1, with the exception that the aryl phosphate surfactant was replaced with sodium dodecyl sulfate (SDS). Polymer 2 was also formulated into a standard eggshell white base formulation.

A series of stains were applied on top of a fully cured commercially available low VOC, 100% acrylic flat paint. Representative stains were applied in excess and removed after 1 hour with gentle dabbing with a wet cloth. The stains were then dried for 24 hours at room temperature. The standard eggshell white base formulations containing polymer 1 and polymer 2 were then applied side by side over the top of the stains and allowed to dry for 24 hours. After 24 hours, a topcoat (either the standard eggshell white base formulation containing polymer 1, the standard eggshell white base formulation containing polymer 2, or the commercial grade flat interior paint) was applied over the middle portion of the first coats. Following 24 hours of curing, samples were measured for the total color difference ($\Delta E$) by fixing an unstained portion of a two-coated region as a standard and then measuring the two-coated region over a stained region. Better stain blocking is observed with lower $\Delta E$ values. The results are shown in Table 4 below.

TABLE 4

$\Delta E$ Values of Finished Coating over a Stain as Compared to a Non-Stained Region

| Second Coat | Polymer 1 | | Polymer 2 | | Commercial Flat | |
|---|---|---|---|---|---|---|
| First coat | 1 | 2 | 1 | 2 | 1 | 2 |
| Grape Juice | 0.33 | 0.32 | 0.27 | 0.31 | 0.23 | 0.29 |
| Mustard | 0.06 | 0.13 | 0.08 | 0.12 | 0.04 | 0.05 |
| Coffee | 0.77 | 1.15 | 0.87 | 1.34 | 0.44 | 0.67 |
| Green Washable Marker | 8.47 | 12.43 | 10.03 | 13.79 | 7.44 | 10.30 |
| Green Highlighter | 5.63 | 8.19 | 4.75 | 7.23 | 6.10 | 6.99 |
| Blue Dry Erase Marker | 0.36 | 0.33 | 0.32 | 0.30 | 0.19 | 0.22 |
| Red Washable Marker | 14.97 | 17.59 | 17.41 | 22.26 | 11.75 | 14.87 |
| Black Sharpie | 0.12 | 0.31 | 0.22 | 0.23 | 0.18 | 0.22 |

"1" indicates the standard eggshell white base formulation containing polymer 1;
"2" indicates the standard eggshell white base formulation containing polymer 2

From the same stain panels whiteness indices were also measured of the two-coated stained regions against the unstained two-coated regions used as a blank or standard. Measurements were made in accordance with the method described in ASTM E 313-10 entitled "Standard Practice for Calculating Yellowness and Whiteness Indices from Instrumentally Measured Color Coordinates," which is incorporated herein by reference in its entirety. Better white coverage is observed with higher values. The results are shown in Table 5 below.

TABLE 5

Whiteness Index Values of Finished Coating over a Stain as Compared to a Non-Stain Region

| Second Coat | Polymer 1 | | Polymer 2 | | Commercial Flat | |
|---|---|---|---|---|---|---|
| First Coat | 1 | 2 | 1 | 2 | 1 | 2 |
| Grape Juice | 85.97 | 85.17 | 86.25 | 85.67 | 76.96 | 76.60 |
| Mustard | 85.06 | 84.84 | 85.54 | 85.24 | 76.58 | 76.32 |
| Coffee | 80.74 | 78.37 | 80.61 | 77.75 | 74.30 | 73.00 |
| Green Washable Marker | 62.36 | 54.18 | 60.98 | 53.16 | 62.35 | 56.96 |
| Green Highlighter | 56.71 | 44.45 | 62.41 | 50.34 | 47.48 | 43.30 |
| Blue Dry Erase Marker | 86.46 | 86.31 | 87.21 | 86.83 | 77.24 | 76.92 |
| Red Washable Marker | 84.68 | 82.52 | 84.06 | 79.96 | 81.40 | 76.65 |
| Black Sharpie | 85.81 | 85.84 | 86.36 | 86.38 | 76.55 | 76.37 |

"1" indicates the standard eggshell white base formulation containing polymer 1;
"2" indicates the standard eggshell white base formulation containing polymer 2

The compositions and methods of the appended claims are not limited in scope by the specific compositions and methods described herein, which are intended as illustrations of a few aspects of the claims and any compositions and methods that are functionally equivalent are intended to fall within the scope of the claims. Various modifications of the compositions and methods in addition to those shown and described herein are intended to fall within the scope of the appended claims. Further, while only certain representative compositions and method steps disclosed herein are specifically described, other combinations of the compositions and method steps also are intended to fall within the scope of the appended claims, even if not specifically recited. Thus, a combination of steps, elements, components, or constituents may be explicitly mentioned herein or less, however, other combinations of steps, elements, components, and constituents are included, even though not explicitly stated. The term "comprising" and variations thereof as used herein is used synonymously with the term "including" and variations thereof and are open, non-limiting terms. Although the terms "comprising" and "including" have been used herein to describe various embodiments, the terms "consisting essentially of" and "consisting of" can be used in place of "comprising" and "including" to provide for more specific embodiments of the invention and are also disclosed. Other than in the examples, or where otherwise noted, all numbers expressing quantities of ingredients, reaction conditions, and so forth used in the specification and claims are to be understood at the very least, and not as an attempt to limit the application of the doctrine of equivalents to the scope of the claims, to be construed in light of the number of significant digits and ordinary rounding approaches.

What is claimed is:

1. A multilayer particle comprising
   (i) a first layer comprising a first copolymer derived from a soft ethylenically-unsaturated monomer, a phosphorus-containing monomer, and an acetoacetoxy monomer; and
   (ii) a second layer surrounding at least a portion of the first layer comprising a second polymer derived from at least 90% by weight of one or more hard ethylenically-unsaturated monomers selected from the group consisting of methyl methacrylate, styrene, and combinations thereof, based on the total weight of monomers used to form the second polymer;
   wherein the particle exhibits a single $T_g$, measured using DSC, ranging from $-10°$ C. to $25°$ C.

2. The multilayer particle of claim 1, wherein the first copolymer is derived from
   (i) greater than 80% by weight of one or more (meth)acrylate monomers;
   (ii) greater than 0% by weight to 5% by weight of one or more carboxylic acid-containing monomers;
   (iii) greater than 0% by weight to 10% by weight of one or more acetoacetoxy monomers;
   (iv) greater than 0% by weight to 5% by weight of one or more phosphorus-containing monomers; and
   (v) optionally one or more additional ethylenically-unsaturated monomers, excluding monomers (i), (ii), (iii), and (iv).

3. The multilayer particle of claim 2, wherein the one or more (meth)acrylate monomers are selected from the group consisting of methyl methacrylate, butyl acrylate, 2-ethylhexyl acrylate, and combinations thereof.

4. The multilayer particle of claim 2, wherein
   the one or more carboxylic acid-containing monomers are selected from the group consisting of acrylic acid, methacrylic acid, itaconic acid, maleic acid, fumaric acid, and combinations thereof;
   the one or more phosphorus-containing monomers are selected from the group consisting of 2-phosphoethyl methacrylate (PEM), 2-phosphopropyl methacrylate, 3-phosphopropyl methacrylate, phosphobutyl methacrylate, 3-phospho-2-hydroxypropyl methacrylate, and combinations thereof; and
   the one or more acetoacetoxy monomers are selected from the group consisting of acetoacetoxyethyl (meth)acrylate (AAEM), acetoacetoxypropyl (meth)acrylate, acetoacetoxybutyl (meth)acrylate, 2,3-di(acetoacetoxy)propyl (meth)acrylate, allyl acetoacetate, vinyl acetoacetate, and combinations thereof.

5. An aqueous composition comprising a plurality of multilayer particles defined by claim 1 dispersed in an aqueous medium.

6. The aqueous composition of claim 5, wherein the aqueous composition further comprises an aryl phosphate surfactant.

7. The composition of claim 6, wherein the aryl phosphate surfactant comprises a tristyrylphenol alkoxylated phosphate.

8. A coating comprising a plurality of multilayer particles defined by claim 1.

9. A method of making a multilayer particle, comprising
   (i) polymerizing a soft ethylenically-unsaturated monomer, a phosphorus-containing monomer, and an acetoacetoxy monomer in a first emulsion polymerization step to produce a first copolymer; and
   (ii) polymerizing one or more hard ethylenically-unsaturated monomers selected from the group consisting of methyl methacrylate, styrene, and combinations thereof in a second emulsion polymerization step to produce a second polymer, wherein the one or more hard ethylenically-unsaturated monomers comprise at least 90% by weight of the monomers polymerized to form the second polymer,
   wherein the particle exhibits a single $T_g$, measured using DSC, ranging from $-10°$ C. to $25°$ C.

10. The method of claim 9, wherein the first emulsion polymerization step further comprises an aryl phosphate surfactant.

11. The method of claim 10, wherein the aryl phosphate surfactant comprises a tristyrylphenol alkoxylated phosphate surfactant.

12. The method of claim 9, wherein the first polymerization step is carried out at a first polymerization temperature of less than or equal to 85° C., and the second polymerization step is carried out at a second polymerization temperature of less than or equal to 85° C.

* * * * *